United States Patent
Hecht et al.

(10) Patent No.: US 7,593,581 B2
(45) Date of Patent: Sep. 22, 2009

(54) PROCESS FOR THE ACQUISITION OF IMAGES FROM A SAMPLE WITH A MICROSCOPE

(75) Inventors: Frank Hecht, Weimar (DE); Ralf Engelmann, Jena (DE); Ralf Wolleschensky, Apolda (DE)

(73) Assignee: Carl Zeiss Micro Imaging GmbH, Jena (DE)

( * ) Notice: Subject to any disclaimer, the term of this patent is extended or adjusted under 35 U.S.C. 154(b) by 604 days.

(21) Appl. No.: 10/967,332

(22) Filed: Oct. 19, 2004

(65) Prior Publication Data
US 2006/0011860 A1   Jan. 19, 2006

(30) Foreign Application Priority Data
Jul. 16, 2004   (DE)   ........................ 10 2004 034 975

(51) Int. Cl.
*G06K 9/36*   (2006.01)
(52) U.S. Cl. .................. 382/232; 382/128; 382/133; 382/154
(58) Field of Classification Search .................. 348/79; 356/72, 326; 250/458.1; 430/321; 382/133, 382/154, 100, 128, 232; 435/287.2, 6, 252.3, 435/254.2; 506/1; 530/350; 536/23.5
See application file for complete search history.

(56) References Cited

U.S. PATENT DOCUMENTS

| | | | | |
|---|---|---|---|---|
| 4,407,008 | A | * | 9/1983 | Schmidt et al. ............... 348/79 |
| 5,757,474 | A | * | 5/1998 | Sopori et al. .................. 356/72 |
| 6,642,041 | B2 | * | 11/2003 | Chen et al. .................. 435/226 |
| 6,711,283 | B1 | | 3/2004 | Soenksen .................... 382/133 |
| 6,930,314 | B2 | * | 8/2005 | Jackson et al. ........... 250/458.1 |
| 7,014,988 | B2 | * | 3/2006 | DeVoe et al. ................ 430/321 |
| 7,033,781 | B1 | * | 4/2006 | Short ........................ 435/69.1 |
| 7,153,678 | B2 | * | 12/2006 | Jackson et al. .............. 435/196 |
| 7,372,985 | B2 | * | 5/2008 | So et al. ..................... 382/133 |

FOREIGN PATENT DOCUMENTS

| | | |
|---|---|---|
| DE | 23 60 197 A1 | 6/1975 |
| DE | 197 02 753 A1 | 7/1998 |
| DE | 102 57 237 A1 | 6/2003 |

(Continued)

OTHER PUBLICATIONS

Doukoglou, T. D., et al., *Image Coding and Compression of Confocal Microscope Volumetric 3D Images*, 18$^{th}$ Annual International Conference of the IEEE Engineering in Medicine and Biology Society, Amsterdam, 1996, pp. 1215-1217, XP002317475.

(Continued)

*Primary Examiner*—Anh Hong Do
(74) *Attorney, Agent, or Firm*—Jacobson Holman PLLC

(57) ABSTRACT

Process for the acquisition of images from a sample with a microscope, wherein detected image data that correspond to three dimensional probe regions are detected and stored to memory, wherein data compression ensues in that the data of images lying next to one another and over one another on the probe are taken into consideration during compression. A stack of images is advantageously recorded and images that are respectively adjacent in the image stack are consulted for the compression of data. Temporally and/or spectrally detected and stored data shall be consulted for the compression of data.

4 Claims, 4 Drawing Sheets

FOREIGN PATENT DOCUMENTS

JP  2003-217496  7/2003
WO  WO 88 07695  10/1988

OTHER PUBLICATIONS

Vlaicu, A., et al., *New Compression Techniques for Storage and Transmission of 2D and 3D Medical Images*, Society of Photo-Optical Instrumentation Engineers (SPIE), vol. 2451, Mar. 1995, pp. 370-377, XP000732674.

Boon-Lock, Y., et al., *Volume Rendering of DCT-Based Compressed 3D Scalar Data*, IEEE Transactions on Visualization and Computer Graphics, vol. 1, No. 1, Mar. 1995, XP000530278.

Chan, K. K., et al., *Three- Dimensional Transform Compression of Images from Dynamic Studies*, SPIE, vol. 1232, Medical Imaging IV: Image Capture and Display (1990), pp. 322-326, XP002317476.

Roese, J. A., et al., *Interframe Cosine Transform Image Coding*, IEEE Transactions on Communications, vol. Com-25, No. 11, Nov. 1977, pp. 1329-1339, XP000615130.

Abdul-Karim, M.-A., et al., *Automated Tracing and Change Analysis of Angiogenic Vasculature from In Vivo Multiphoton Confocal Image Time Series*, Microvascular Research, vol. 66, 2003, pp. 113-125.

Gustafsson M., G., L., et al., *Doubling the Lateral Resolution of Wide-Field Fluorescense Microscopy Using Structured Illumination*, Three-dimensional and Multidimensional Microscopy: Image Acquisition Processing VII, SPIE, vol. 3919, 2000, pp. 141-150.

Umenishi, F., et al., *cAMP Regulated Membrane Diffusion of a Green Fluorescent Protein-Aquaporin 2 Chimera*, Biophysical Journal, vol. 78, Feb. 2000, pp. 1024-1035.

Zhang, H. L., et al., *Neurotrophin-Induced Transport of a β-Actin mRNP Complex Increases β-Actin Levels and Stimulates Growth Cone Motility*, Neuron, vol. 31, Aug. 2001, pp. 261-275.

Petersen, M., et al., *Diverse Microglial Motility Behaviors During Clearance of Dead Cells In Hippocampal Slices*, GLIA, vol. 46, 2004, pp. 195-206.

Bertera, S., et al., *Body Window-Enabled In Vivo Multicolor Imaging of Transplanted Mouse Islets Expressing an Insulin-Timer Fusion Protein*, BioTechniques, vol. 35, No. 4, 2003, pp. 718-722.

Brum, G., et al., *Fast Imaging in Two Dimensions Resolves Extensive Sources of $Ca^2$ + Sparks In Frog Skeletal Muscle*, Journal of Physiology (2000), vol. 528.3, pp. 419-433.

Schmidt, H., et al., *Mutational Analysis of Dendritic $Ca^2$ + Kinetics in Rodent Purkinje Cells: Role of Parvalbumin and Calbindin $D_{28k}$*, Journal of Physiology (2003), vol. 551.1, pp. 13-32.

Pawley, et al., *Handbook of Biological Confocal Microscopy*, pp. 461-462, Plenum Press, 1994.

* cited by examiner

PROCESS FOR THE ACQUISITION OF IMAGES FROM A SAMPLE WITH A MICROSCOPE

BACKGROUND OF THE INVENTION

1. Field of the Invention

The invention relates to a method for the efficient management of data in microscopy.

2. Related Art

Image data series from confocal or 4D-microscopes are stored to memory largely at a ratio of 1:1 relative to spatial and temporal data density. The resulting data sets attain orders of magnitude, in the interim, that can just roughly be processed by standard computers performing with thoroughly high capacity. Archiving of the image data series is difficult in spite of DVD technology, and is in part only possible through a network with expensive file servers. For reasons of data security, a local or even mobile filing system is also often preferred. Furthermore, the scanning speeds of modern confocal or 4D-microscopes operating in parallel are becoming significantly higher which means that data sets can be further expanded.

The discontinuous and intelligent data format required for the multimodal image information, including subsequent retrieval of information by interpolation, does not exist to date in confocal or 4D-microscopy.

D. R. Soll et al. describe in 2003 in Scientific World Journ., 3:827-841 a software based analysis of movement of microscopic data on the nuclei and pseudopodia in living cells in all 3 spatial dimensions. These data records come to acquire enormous sizes in spite of the moderate recording speed so that the results must be mathematically represented in part and not entirely visually.

M. A. Abdul-Karim et al. describe in 2003 in Microvasc. Res., 66:113-125 a long term analysis of changes in the blood vessels of living animals, wherein fluorescent images were recorded at intervals over several days. The 3D data records were evaluated with adapted algorithms to schematically illustrate the trajectories of movement. The magnitude of the data records presents a problem; the original structures were not reconstituted.

R. Grossmann et al. describe in 2002 in Glia, 37:229-240 a 3D analysis of the movements of microglia cells in rats, whereby the data was recorded for up to 10 hours. At the same time, after traumatic injuries, the neuroglia also react with rapid reactions so that a high data rate and correspondingly large volumes of data are generated.

SUMMARY OF THE INVENTION

The invention describes a method for the efficient management of data in microscopy. By omitting data or compressing data that has low event density in one dimension, space is to be created in other dimensions for the storage of much more data with higher event density. The corresponding data format represents a novelty in high speed confocal or 4D-microscopy.

To solve the problem, an efficient and new type of data management system is to be used in confocal or 4D-microscopy. This is especially necessary since in the future, long term experiments will be conducted with high temporal resolution in all three spatial dimensions (=4D).

The solution consists therein that the density of the information will be adapted to the event density of the dimensions. First of all, this means that with low event density, the data can be skipped and recovered later by interpolation. Furthermore, the data record is compressed, and also to varying degrees, depending on the density of the information. In addition to this, the dimensions are weighted against one another; in the case of low temporal event density, the spatial information is more highly resolved, in the case of high temporal event density however, it is more lowly resolved. Within the spatial dimensions, X/Y (surface) is again more highly weighted than Z (depth). For fluid compression, interpolation and subsequent representation of such image data series, a favorable load is also required of the computers used. The possibility is provided for downloading said image data series on to the frame grabber or on the graphics card or at least to partially involve these components in sharing the load.

DETAILED DESCRIPTION OF THE PREFERRED EMBODIMENTS

Figure 1:
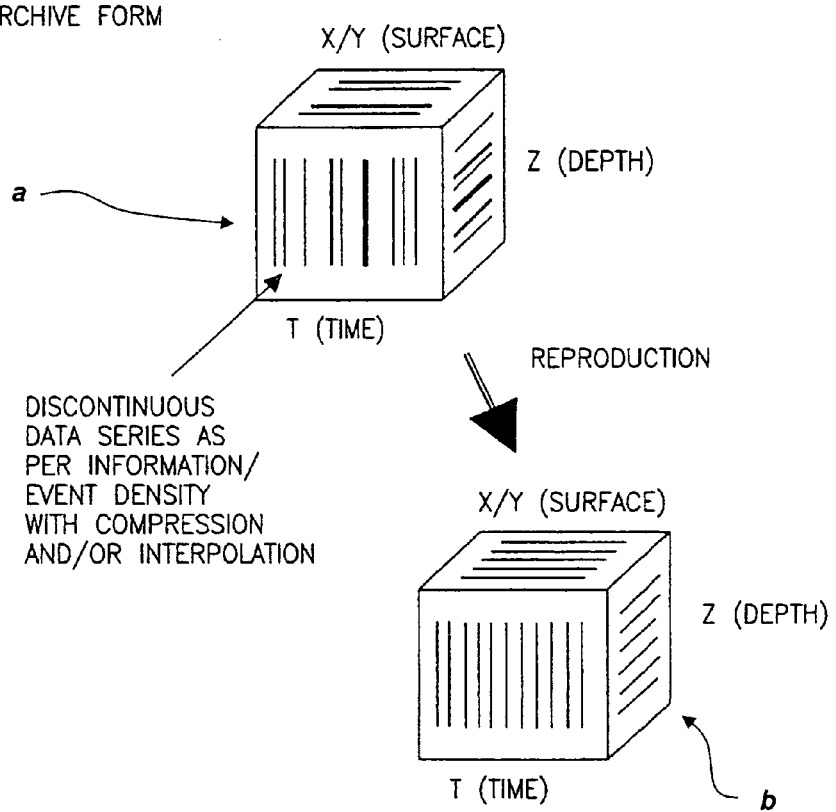
FIG. 1 shows a basic representation of the event-related data reduction in 4 dimensions and of the distortion in reproduction.

In FIG. 1, a complete multidimensional image data record a is represented relative to the recorded coordinates of X, Y, Z and to the appertaining recording time t. Based on the different line thicknesses, it is schematically represented that the data compression within an image data record can vary, for example, thicker lines stand for higher compression than thinner lines. A final data record b is stored to memory that serves the user as a rendition. Said user has the advantage of being able to observe or to record at different levels of resolution in time or in space, depending on the setting.

Figure 2:
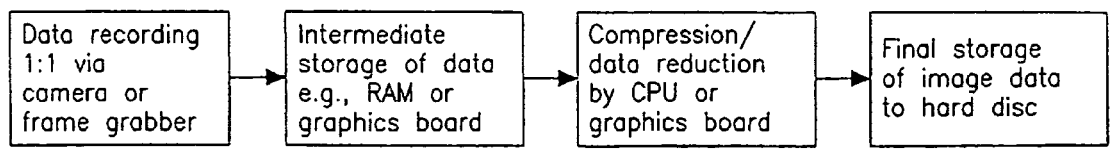
FIG. 2 schematically shows the sequence of operations for data reduction from recording to the final data storage in memory.

FIG. 2 schematically shows the Sequence of operations for data reduction from recording to the final data storage in memory. The targeted reduction of data is schematically represented here:

Data recording 1:1, on camera or frame grabber

Intermediate storage of the data, e.g., RAM or graphics board

Compression/data reduction by the CPU or graphics board

Final storage of the image data on hard disc

Basically, data can be reduced according to different operations:

1. Automatically:

In the case of low temporal event density, the spatial information could be stored with higher resolution, while the temporal information (for example, by omitting a time frame) could be skipped.

In the event of high activity within a time period (very rapidly progressing specimen segments), the temporal resolution could be fully preserved and the spatial resolution could be reduced.

2. Based on specified user input:

Based on his expectations, the user establishes whether and how he wants to have the change-laden spatial or temporal events processed and as a result of his specified input, the corresponding data component is reduced or retained.

The user can also establish image regions (regions of interest), specifiable in one or in multiple dimensions, for which a specific amount of data compression is to be implemented, or which are to be automatically set.

Figure 3:
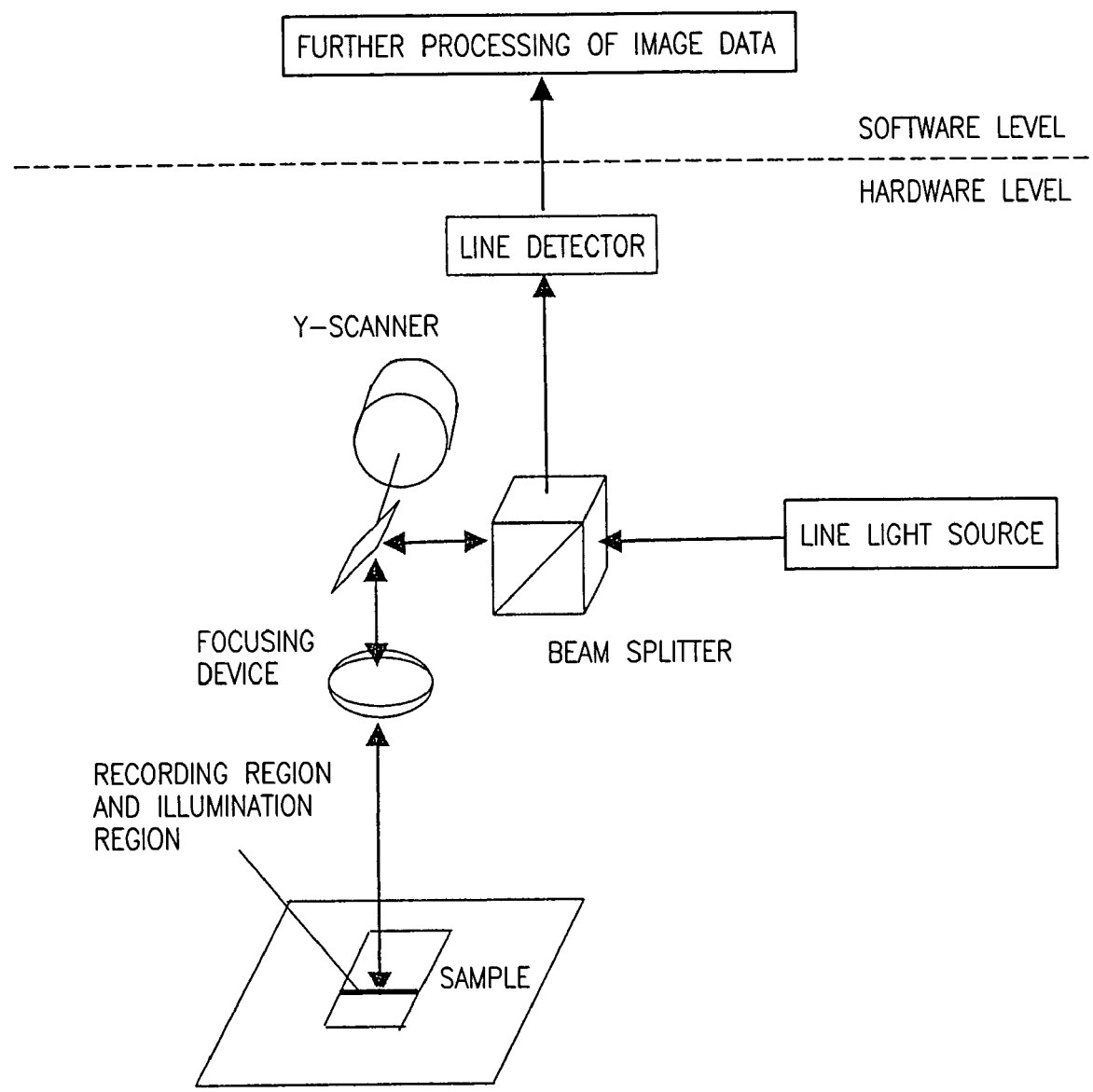
FIG. 3 exemplarily shows a basic high speed microscope system.

FIG. 3 exemplarily shows a basic high speed microscope system, which generates data images in volumes that are unusually large by current standards. Schematically represented is a line scanner with a linear light source and a line detector, whereby an illuminating line lying in the X direction is moved over the specimen by a Y scanner. The image data detected by the line detector is stored at the level of the software, as shown in FIG. 2. Via a stage setting or a Z setting on the focusing device, a vertical adjustment is generated so that the specimen coordinates in the X, Y and Z directions are stored to memory in a time-dependent mode.

Figure 4:
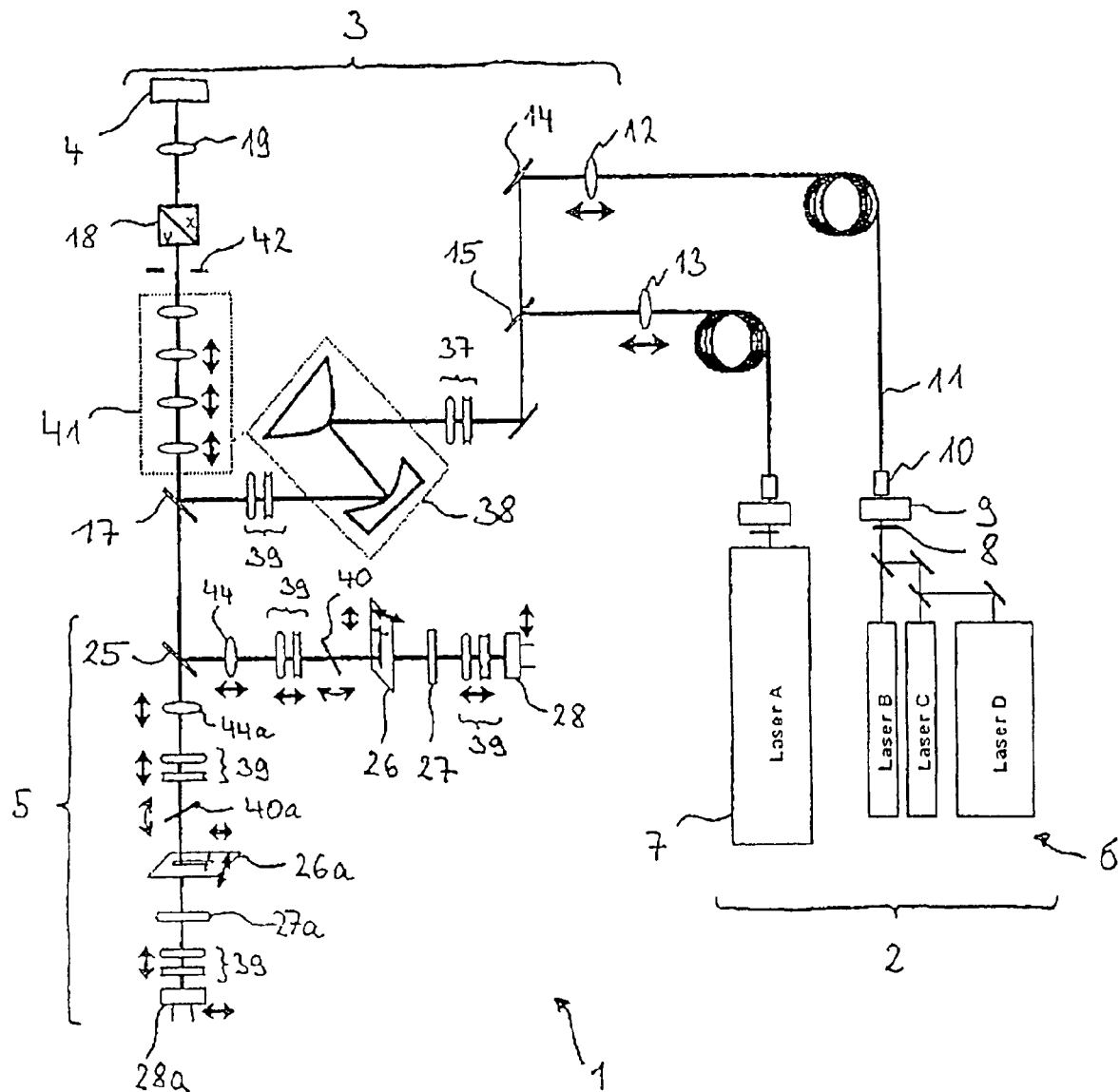
FIG. 4 schematically shows a laser scanning microscope.

FIG. 4 schematically shows a laser scanning microscope 1, which is basically comprised of five components: of a beaming source module 2, which generates excitation radiation for laser scanning microscopy, of a scanning module 3, which conditions the excitation radiation and properly deflects it for scanning over a specimen, of a microscope module 4, only schematically shown for the sake of simplification, which directs the scanning beam made available by the scanning module in a microscopic beam path over the specimen, as well as of a detector module 5, which receives and detects optical irradiation from the specimen. The detector module 5 can hereby be spectrally designed to have multiple channels, as represented in FIG. 4. For the general description of a punctiform sensing laser scanning microscope, we refer to the German patent DE 19702753A1 (U.S. Pat. No. 6,167,173), which is incorporated herein by reference.

The beaming source module 2 generates illuminating radiation, which is suited for laser scanning microscopy, more specifically, radiation which can release fluorescence. Depending on the application, the beaming source module exhibits several sources of radiation to this end. In a represented form of embodiment, two lasers 6 and 7 are provided in the beaming source module 2, after which are connected on the load side a light valve 8 as well as an attenuator 9 and which couple their radiation into a fiber optical wave guide 11 via a coupling point 10. The light valve 8 acts as a beam deflector by which beam cut-out can be effected without having to switch off the operation of the very lasers in the laser unit 6 or 7. The light valve 8 is designed as an AOTF which deflects the laser beam, before coupling into the fiber optical wave guide 11, in the direction of a light trap, not represented here, for the purpose of cutting out the beam.

In the exemplary representation in FIG. 4, the laser unit 6 exhibits three lasers B, C, D, whereas laser unit 7 is only comprised of one laser A. The representation is therefore exemplary of a combination of single and multiple wave length lasers which are individually or also collectively coupled to one or several fiber optics. Coupling can also be done simultaneously via several fiber optics whose radiation is mixed by a color combiner at a later point after running through an optical adaptor. In this manner, it is possible to make use of the most varied wavelengths or wavelength ranges for excitation radiation.

The radiation coupled into the fiber optical wave guide 11 is concentrated by means of optical collimation systems 12 and 13 sliding over beam uniting mirrors 14, 15 and is modified in terms of its beam profile in a beam forming unit.

The collimators 12, 13 ensure that the radiation conducted from the beaming source module 2 to the scanning module 3 is collimated into an infinite beam path. In each case, this is advantageously achieved by a single lens which, under the control of a (non represented) central control unit, has a focusing function by its displacement along the optical axis in that the distance between the collimator 12, 13 and the respective end of the fiber optical wave guide is modifiable.

The beam forming unit, which shall later be explained in more detail, generates a column-shaped beam from the rotationally symmetrical, Gaussian profiled laser beam, as it exists emergent from the beam uniting mirrors 14, 15, said column-shaped beam no longer being rotationally symmetrical in its profile but rather suited for generating an illuminated rectangular field.

This illuminating beam, also referred to as column-shaped, serves as excitation radiation and is guided to a scanner 18 via a primary color splitter 17 and via an optical zoom system, yet to be described. The primary color splitter shall also be detailed later, but let it just be mentioned here, that it has the function of separating the excitation radiation from the irradiation returning from the specimen that originated from the microscope module 4.

The scanner 18 deflects the column shaped beam into one or two axes, after which said beam passes through a scanning objective 19 as well as through a tube lens and an objective of the microscope module 4 to be bundled into a focus 22, which lies in a preparation or in a specimen. The optical image is hereby produced such that the specimen is illuminated in a focal line with excitation radiation.

Fluorescent radiation excited in the linear focus in such a manner arrives, via the objective and the tube lens of the microscope module 4 and via the scanning objective 19, back at the scanner 18 so that in the opposite direction after the scanner 18, a beam once more at rest is to be found. One therefore also speaks of it in such terms that the scanner 18 descans the fluorescent radiation.

The primary color splitter 17 lets the fluorescent radiation lying in wave length ranges other than those of the excitation radiation pass so that it can be rerouted via the deflecting mirror 24 into the detector module 5 and then be analyzed. The detector module 5 exhibits in the form of embodiment in FIG. 4 several spectral channels, that is to say, the fluorescent radiation coming from the deflecting mirror 24 is divided into two spectral channels in a secondary color splitter 25.

Each spectral channel comprises a slotted aperture 26 which produces a confocal or partially confocal image of the specimen 23 and whose aperture size establishes the depth of focus with which the fluorescent radiation can be detected. The geometry of the slotted aperture 26 therefore determines the microsectional plane within the (thick) preparation from which fluorescent radiation is detected.

Arranged after the slotted aperture 26 is also a blocking filter 27, which blocks off undesirable excitation radiation arriving at the detector module 5. The column-shaped fanned-out beam separated off in such a manner, originating from a specific depth segment is then analyzed by an appropriate detector 28. The second spectral detection channel is also constructed in analogy to the depicted color channel, and also comprises a slotted aperture 26a, a blocking filter 27a as well as a detector 28a.

The use of a confocal slotted aperture in the detector module 5 is only exemplary. Of course, a point to point positioning scanner can also be produced. The slotted apertures 26, 26a are then replaced by pinhole apertures and the beam forming unit can be omitted. Incidentally, all of the optical components for such a construction are designed to be rotationally symmetrical. Then also, instead of single spot scanning and detection, basically random multiple point configurations can be used such as point clusters or Nipkow disc concepts, as shall yet be detailed later by way of FIGS. 6 and 7. However, it is then essential that the detector 28 have positional resolution since parallel acquisition is effected on several probing spots by the scanner during sweeping.

In FIG. 4 it can be seen that the Gaussian bundle of rays, occurring after the movable, that is to say, sliding collimators 12 and 13, is made to converge via stepped mirrors in the form of beam uniting mirrors 14, 16 and in the mode of construction shown, comprising a confocal slotted aperture, is then subsequently converted into a bundle of rays with a rectangular beam cross profile. In the form of embodiment in FIG. 1, a cylinder telescope 37 is used in the beam forming unit, after which is arranged an aspherical unit 38 followed by a cylindrical lens system 39.

After reshaping, a beam is obtained which, on a sectional plane, basically illuminates a rectangular field wherein the distribution of intensity along the longitudinal axis of the field is not Gaussian shaped but rather box shaped.

The illumination configuration with the aspherical unit 38 can simultaneously serve to fill the pupil between a tube lens and an objective. By such means, the optical resolution of the objective can be fully exploited. This variant is therefore equally purposeful in a single spot or multiple spot scanning microscope system, e.g., in a line scanning system (in the case of the latter, in addition to the axis in which the focus is on or in the specimen).

The excitation radiation transformed into a line, for example, is guided to the primary color splitter 17. Said splitter is designed in a preferred form of embodiment as a spectrally neutral splitter mirror in accordance with the German patent DE 10257237 A1, the contents of which are incorporated by reference herein in their entirety. The concept of "color splitter" also covers splitter systems acting in a non-spectral manner. In place of the described spectrally independent color splitter, a homogeneous neutral splitter (e.g., 50/50, 70/30, 80/20 or such similar) or a dichroitic splitter can also be used. In order to make an application based selection possible, the primary color splitter is preferably to be provided with mechanics that make a simple change possible, for example by a corresponding splitter wheel which contains individual, interchangeable splitters.

A dichroitic primary color splitter is especially advantageous in the case when coherent, that is to say, when oriented radiation is to be detected such as, for example, Stoke's or anti-Stoke's Raman spectroscopy, coherent Raman processes of higher order, general parametric non-linear optical processes such as second harmonic generation, third harmonic generation, sum frequency generation, two photon absorption and multiple photon absorption or fluorescence. Several of these processes from non-linear optical spectroscopy require the use of two or of several laser beams that are co-linearly superimposed. To this end, the described unification of beams from several lasers proves to be especially advantageous. Basically, the dichroitic beam splitters widely used in fluorescence microscopy can be applied. It is also advantageous for Raman spectroscopy to use holographic notch splitters or filters in front of the detectors to suppress Rayleigh scattering.

In the form of embodiment in FIG. 4, the excitation radiation or the illuminating radiation is guided to the scanner 18 via a motor driven optical zoom system 41. With this setup, the zoom factor can be adjusted and the scanned visual field is continuously variable within a specific range of adjustment. Especially advantageous is an optical zoom system in which the position of the pupil is maintained throughout the continuous tuning process while the focal position and the image dimensions are being adjusted. The three degrees of freedom of the motor for the optical zoom system 41, represented in FIG. 4 and symbolized by the arrows, exactly correspond to the number of degrees of freedom provided for the adaptation of the three parameters, the image dimensions, the focal position and pupil position. Especially advantageous is an optical zoom system 41 with a pupil on whose exit face a stationary aperture 42 is arranged. In a simple and practical embodiment, the aperture 42 can also be provided by the delimitation of the mirror surface of the scanner 18. The exit face aperture 42 with the optical zoom system 41 achieves the following: that independent of the adjustment made on zoom magnification, there is always a fixed pupil diameter formed on the scanning objective 19. Thereby, the objective's pupil remains completely illuminated even during random selection on the optical zoom system 41. The use of an independent aperture 42 advantageously prevents the incidence of undesirable stray radiation in the range of the scanner 18.

The cylindrical telescope 37 works together with the optical zoom system 41, said telescope also being activated by a motor and connected before the aspherical unit 38. It is selected in the form of embodiment presented in FIG. 2 for reasons of compactness, but this need not be the case.

If a zoom factor of less than 1.0 is desired, the cylindrical telescope 37 is automatically pivoted into the optical path of the beam. Said telescope prevents the aperture diaphragm 42 from being incompletely illuminated when the zoom objective 41 setting is scaled down. The pivotable cylindrical telescope 37 thereby ensures that even with zoom factor settings of less than 1, that is to say, independent of any adjustment change in the optical zoom system 41, there will always be an illuminated line of constant length on the locus of the objective's pupil. As compared to a simple visual field zoom, losses in laser performance as expressed in the laser's illuminating beam are avoided owing to this.

Since an image brightness jump cannot be avoided in the illumination line when the cylindrical telescope 37 is being pivoted, it is provided in the (non-represented) control unit, that the feed rate of the scanner 18 or the gain factor for the detectors in the detector module 5 is adapted accordingly when the cylindrical telescope 37 is activated so that the image brightness can be maintained at a constant.

In addition to the motor driven optical zoom system 41 as well as to the motor activated cylindrical telescope 37, there are also remote controlled adjusting elements provided in the detector module 5 of the laser scanning microscope in FIG. 1. To compensate for longitudinal color errors, for example, are provided, before the slotted aperture, a circular lens 44 as well as a cylindrical lens system 39, and directly before the detector 28, a cylindrical lens system 39, all of which are respectively motor driven to slide in the axial direction.

Additionally provided for the sake of compensation is a correcting unit 40 which shall briefly be described in the following.

The slotted aperture 26 forms, together with a circular lens 44 arranged in front of it as well as with the equally prearranged first cylindrical lens system 39 as well as with the subsequently arranged second cylindrical lens system, a pinhole objective of the detector assembly 5, wherein the pinhole here is realized by the slotted aperture 26. In order to avoid the unwanted detection of reflected excitation radiation in the system, there is yet a blocking filter 27 that is connected in advance of the second cylindrical lens 39, which enjoys the proper spectral characteristics to exclusively admit desirable fluorescent radiation to the detector 28, 28*a*.

A change in the color splitter 25 or in the blocking filter 27 unavoidably causes a certain tilt or wedge error during pivoting. The color splitter can cause an error between the sampled region and the slotted aperture 26; the blocking filter 27 can cause an error between the slotted aperture 26 and the detector 28. To avoid the necessary readjustment of the position of the slotted aperture 26 or of the detector 28, a plane parallel plate 40 is arranged between the circular lens 44 and the slotted aperture 26, that is to say, in the imaging beam path between the specimen and the detector 28, so that said plate can be brought into various rocking positions by activation of a controller. The plane parallel plate 40 is adjustably mounted in a holding fixture suited to this end.

Figure 5:
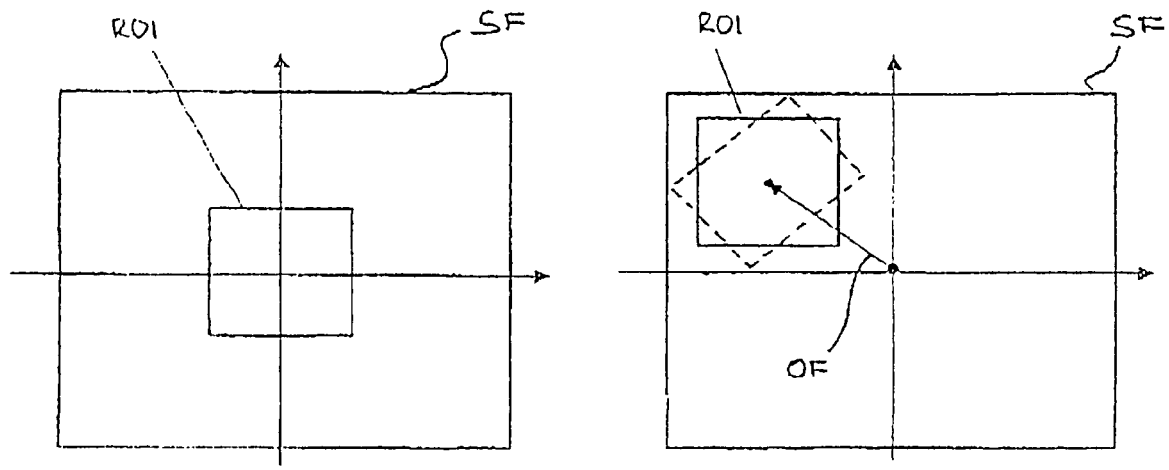
FIG. 5 shows how a region of interest (ROI) can be selected.

With the help of the optical zoom system 41 and within the maximum scanning field SF available, FIG. 5 shows how a region of interest (ROI) can be selected. If the control setting on the scanner 18 is left such that the amplitude does not change, for example, as is forcibly the case with resonance scanners, a magnification setting greater than 1.0 on the optical zoom system has the effect of narrowing in the selected region of interest (ROI) centered around the optical axis of the scanning field SF.

Resonance scanners are described, for example, in Pawley, Handbook of Biological Confocal Microscopy, Plenum Press 1994, pages 461 and following.

If the scanner is manipulated in such a manner that it scans a field asymmetrically to the optical axis, that is to say, in the resting position of the scanner mirrors, then one obtains an offset displacement OF in the selected region of interest (ROI) in association with the zooming action. Based on the previously mentioned action of the scanner 18, namely of descanning, and based on a repeat run through the optical zoom system 41, the selection of the region of interest (ROI) in the detection beam path is again cleared in the direction of the detector. One can hereby make a selection of the desired region of interest (ROI) within the range offered by the scanning image SF. In addition, for different selections within the region of interest (ROI), one can acquire images and then compose them into an image with high resolution.

If one not only wishes to shift the selected region of interest by the use of an offset OF relative to the optical axis, but also wishes to rotate said region, there is a purposeful form of embodiment which provides for an Abbe König prism in a pupil of the beam path between the primary color splitter 17 and the specimen 23, which obviously leads to the rotation of the image field. This image is also cleared in the direction of the detector. Now one can measure images with different offset displacements OF and with different angles of rotation and after that, they can be computed into a high resolution image, for example, in accordance with an algorithm, as described in the publication by M. Gustafsson, "Doubling the lateral resolution of wide-field fluorescence microscopy using structured illumination" in "Three-dimensional and multidimensional microscopy: Image acquisition processing VII", Proceedings of SPIE, Vol. 3919 (2000), p 141-150.

Figure 6:
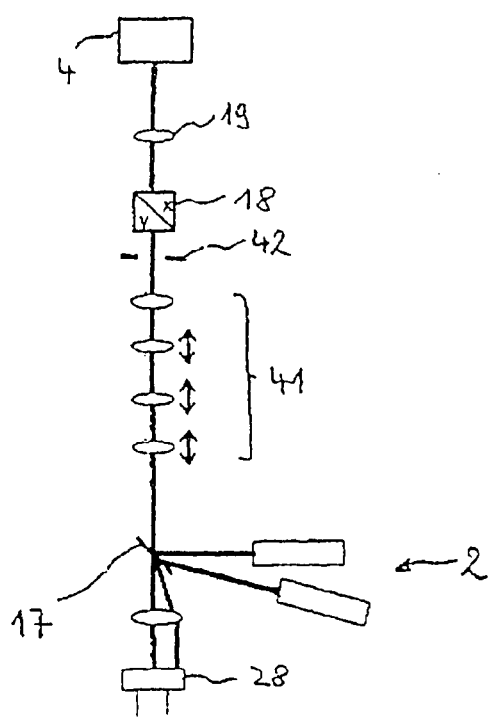
FIG. 6 shows another possible mode of construction for a laser scanning microscope.

FIG. 6 shows another possible mode of construction for a laser scanning microscope 1, in which a Nipkow disc has been integrated. The light source module 2, which is highly simplified in its representation in FIG. 6, illuminates a Nipkow disc 64, via the primary color splitter 17 in a mini-lens array 65, as described, for example, in the U.S. Pat. No. 6,028,306, WO 88 07695 or DE 2360197 A1. The pinholes of the Nipkow disc illuminated via the mini-lens array 65 are imaged onto the specimen located in the microscope module 4. In order to be able to also vary the size of the image on the specimen side, an optical zoom system 41 is again provided here.

As a modified arrangement of the mode of construction in FIG. 4, in the Nipkow scanner, illumination is effected by passing through the primary color splitter 17 and the radiation to be detected is reflected out.

Furthermore, the detector 28 is now designed with regional resolving power so as to also properly enable parallel scanning of the multiple spots illuminated which is achieved by the use of a Nipkow disc 64. Furthermore, between the Nipkow disc 64 and the optical zoom system 41, is arranged an appropriate stationary optical lens system 63 with positive refracting power which transforms the rays divergently exiting through the pinholes of the Nipkow disc 64 into suitable ray bundle diameters. The primary color splitter 17 for the Nipkow construction in FIG. 3 is a classic dichroitic beam splitter, that is to say, it is not the aforementioned beam splitter with a slot-shaped or punctiform reflecting region.

The optical zoom system 41 corresponds to the mode of construction previously detailed, whereby the scanner 18 now becomes redundant with the Nipkow disc 64. Nevertheless, said scanner can be provided if one wishes to undertake the selection of a region of interest (ROI) detailed in FIG. 5. The same applies to the Abbe König prism.

Figure 7:
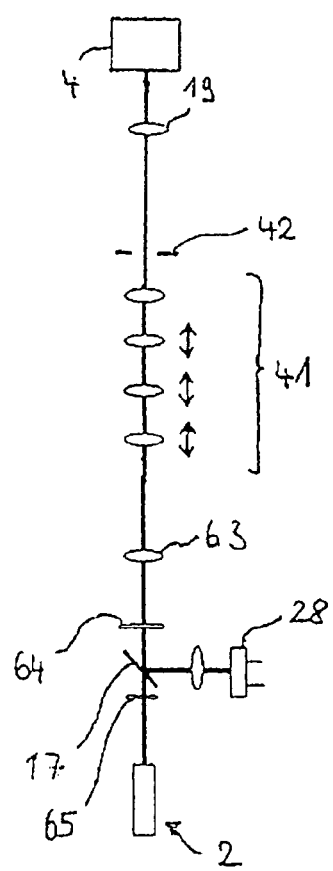
FIG. 7 shows an alternate approach with multiple spot scanning.

An alternate approach with multiple spot scanning is shown in schematic representation in FIG. 7, in which several light sources obliquely beam into the scanner pupil. Here also, a zooming function can be realized by the use of an optical zoom system 41 for imaging, to be configured between the primary color splitter 17 and the scanner 18, as represented in FIG. 5. By simultaneous beaming of light bundles at different angles on a plane conjugate with the pupil, light spots are produced on a plane conjugate with the plane of the object, which are simultaneously guided by the scanner 18 over subregions of the total object field. Data on the images are generated by the evaluation of all subimages on a matrix detector 28 with resolving mapping power.

As another form of embodiment coming under consideration is multiple spot scanning, as described in the U.S. Pat. No. 6,028,306, whose revelation is fully integrated here in terms of this. Here as well, a detector 28 with positional resolving power is to be provided. The specimen is then illuminated by a multiple point light source, which is realized by a beam expander with a post-positioned microlens array, which illuminates a multiple aperture plate in such a manner that a multiple point light source is produced.

In the following, an advantageous process in accordance with the invention shall be more closely detailed.

The implementation describes a method for depletion-laden data compression of 3D and 4D data upon storage to memory of data images with a microscope system. Data compression of image stacks in the 3 dimensions of x, y, and z is achieved by the two steps of 3D digital cosine transformation and of quantization of the results of the 3D digital cosine transformation.

By the use of a 3-dimensional digital cosine transformation and subsequent quantization, the relation between image quality and data sets of the compressed data can be substantially improved as compared to the 2-dimensional process for the individual layers of an image stack.

The 3D image stack is subdivided into cubes of adjacent volume elements. One cube has m-volume elements in the x-direction, n-volume elements in the y-direction and o-volume elements in the z-direction. The individual cubes can hereby also have different numbers of volume elements in the corresponding dimensions.

In the first step, the values for S(w, v, u) are calculated for each cube:

$$S(w, v, u) = \frac{Cw^* Cv^* Cu^*}{8} * \sum_{z=0}^{o-1} \sum_{y=0}^{n-1} \sum_{x=0}^{m-1} F(z, y, x, w, v, u) \quad (I)$$

wherein $$F(z, y, x, w, v, u) = I(z, y, x) * \cos\frac{(2*x+1)*\pi*u}{2*m} * \quad (II)$$
$$\cos\frac{(2*y+1)*\pi*v}{2*n} * \cos\frac{(2*x+1)*\pi*w}{2*o}$$

u=0 ... m−1,
v=0 ... n−1,
w=0 ... o−1,
Cu, Cv, Cw=1/√2 for u, v=0,
and
Cu, Cv, Cw=1, otherwise.

I(z,y,x) is the intensity of the volume element with the coordinates of x, y, and z relative to the first volume element of the cube. The n*m*o floating decimal point values S(w,v,u) are subsequently multiplied by the quantization factors Q(w,v,u) and converted into whole numbers for Z(w,v,u).

In a following step, the values for Z(w,v,u) are written in an array $$T(i)=Z(Sw(i), Sv(i) \text{ and } Su(i)) \quad (III)$$

i=0 ... n*m*o−1

The values for Sw(i), Sv(i) and Su(i) are selected in such a manner that for each element of Z, there is exactly one element of T. It is sensible, when selecting values for Sw(i), Sv(i) and Su(i) that are low for i also to likewise select low values for Sw(i), Sv(i) and Su(i).

In the last step, the values for T(i), with depletion-laden compression processes such as Huffmann encoding, arithmetical coding and run length encoding, can be further compressed.

For data decompression, first the depletion-laden compression is reversed. After that, the data are converted once again into Z(w,v,u) values by use of the inverse function of (III).

By dividing by the quantization factors of Q(w,v,u), one obtains the floating decimal point values S(w,v,u).

The decompressed data are then determined by the 3D inverse digital cosine transformation:

$$I'(z, y, z) = \frac{1}{8} * \sum_{w=0}^{o-1} \sum_{v=0}^{n-1} \sum_{u=0}^{m-1} Cw * Cv * Cu * F'(z, y, x, w, v, u) \quad (IV)$$

wherein $$F'(z, y, x, w, v, u) = S'(w, v, u) * \cos\frac{(2*x+1)*\pi*u}{2*m} * \quad (V)$$
$$\cos\frac{(2*y+1)*\pi*v}{2*n} * \cos\frac{(2*z+1)*\pi*w}{2*o}$$

x=0 ... m−1,
y=0 ... n−1,
z=0 ... o−1,
Cu, Cv, Cw=1/√2 for u, v=0,
and
Cu, Cv, Cw=1, otherwise.

The degree of compression can be controlled by the quantization factors of Q(w,v,u).

The process can also be applied in the case when time series of image stacks are to be compressed. It is hereby also possible to only compress selected image stacks within a time series.

The described invention represents a significant expansion of the application possibilities for high speed confocal laser scanning microscopes. The significance of such expanded development can be deduced from the standard literature on cell biology and from the processes described there on super fast cellular and subcellular processes (B. Alberts et al. (2002): Molecular biology of the Cell; Garland Science; G. Karp (2002): Cell and Molecular Biology: Concepts and Experiments; Wiley Text Books; R. Yuste et al. (200): Imaging neurons—a laboratory Manual; Cold Spring Harbor Laboratory Press, New York) and from the applied methods of analysis with a multitude of dyes. (G. Karp (2002): Cell and Molecular Biology: Concepts and Experiments; Wiley Text Books; G. Karp (2002): Cell and Molecular Biology: Concepts and Experiments; Wiley Text Books; R. Yuste et al. (200): Imaging neurons—a laboratory Manual; Cold Spring Harbor Laboratory Press, New York; R. P. Haugland (2003): Handbook of fluorescent Samples and research Products, 10$^{th}$ Edition; Molecular Samples Inc. and Molecular Samples Europe BV).

The invention has an especially great significance for the following processes and developments:

Development of Organisms

The described invention is, among other things, suited for the analysis of developmental processes which are characterized foremost by dynamic processes ranging from tenths of seconds to hours in duration. Exemplary applications are described here, for example, at the level of cell groups and whole organisms:

M. A. Abdul-Karim et al. describe in 2003 in Microvasc. Res., 66: 113-125 a long term analysis of changes in the blood vessels of living animals wherein fluorescent images were recorded at intervals over several days. The 3D data records were evaluated with adapted algorithms to schematically illustrate the trajectories of movement.

D. R. Soll et al. describe in 2003 in Scientific World Journ., 3: 827-841 a software based analysis of movement of microscopic data on the nuclei and pseudopodia in living cells in all 3 spatial dimensions.

R. Grossmann et al. describe in 2002 in Glia, 37: 229-240 a 3D analysis of the movements of microglia cells in rats, whereby the data was recorded for up to 10 hours. At the same time, after traumatic injuries, the neuroglia also react with rapid reactions so that a high data rate and correspondingly large volumes of data are generated.

This applies to the following points of emphasis in particular:

Analysis of living cells in a 3D environment whose neighboring cells sensitively react to laser illumination and which must be protected from the illumination of the 3D-ROI [regions of interest];

Analysis of living cells in a 3D environment with markers, which are subject to targeted 3D bleaching by laser illumination, e.g. FRET experiments;

Analysis of living cells in a 3D environment with markers, which are subject to targeted bleaching by laser illumination, and at the same time, are also to be observed outside of the ROI, e.g., FRAP and FLIP experiments in 3D;

Targeted analysis of living cells in a 3D environment with markers and pharmaceutical agents, which exhibit manipulation related changes by laser illumination; e.g., activation of transmitters in 3D;

Targeted analysis of living cells in a 3D environment with markers, which exhibit manipulation related changes in color by laser illumination; e.g., paGFP, Kaede; Targeted analysis of living cells in a 3D environment with very weak markers, which require e.g., an optimal balance in confocality against detection sensitivity.

Living cells in a 3D tissue group with varying multiple markers, e.g. CFP, GFP, YFP, Ds-red, Hc-red and such similar.

Living cells in a 3D tissue group with markers, which exhibit function related changes in color, e.g., Ca+ marker.

Living cells in a 3D tissue group with markers, which exhibit development related changes in color, e.g. transgenic animals with GFP Living cells in a 3D tissue group with markers, which exhibit manipulation related changes in color by laser illumination, e.g., paGFP, Kaede Living cells in a 3D tissue group with very weak markers, which require a restriction in confocality in favor of detection sensitivity.

The last mentioned item in combination with the one preceding it.

Transport Processes in Cells

The described invention is excellent in its suitability for the analysis of intracellular transport processes since the truly small motile structures involved here are to be represented, e.g. proteins, with high speeds (usually in the range of hundredths of seconds). In order to capture the dynamics of complex transport processes, applications are also often used such as FRAP with ROI bleaching. Examples for such studies are described here, for example:

F. Umenishi et al. describe in 2000 in Biophys. J., 78: 1024-1035 an analysis of the spatial motility of aquaporin in GFP transfected culture cells. To this end, targeted spots were locally bleached in the cell membranes and the diffusion of the fluorescence was analyzed in the surroundings.

G. Gimpl et al. describe in 2002 in Prog. Brain Res., 139: 43-55 experiments with ROI bleaching and fluorescent imaging for the analysis of mobility and distribution of GFP-marked oxytocin receptors in fibroblasts. To realize this task, very high demands are made on spatial positioning and resolution as well as on the direct temporal sequence of bleaching and imaging.

Zhang et al. describe in 2001 in Neuron, 31: 261-275 live cell imaging of GFP transfected nerve cells wherein the mobility of granules was analyzed based on a combination of bleaching and fluorescent imaging. To this end, the dynamics of the nerve cells set very high requirements for the imaging speed.

Molecular Interactions

The described invention is particularly well suited for the representation of molecular and other subcellular interactions. To this end, very small structures with high speeds (in the range of hundredths of seconds) must be represented. In order to resolve the spatial position necessary for the observation of molecular interactions, indirect techniques must also be applied such as, for example, FRET with ROI bleaching. Exemplary applications are, for example, described here:

M. A. Petersen and M. E. Daily describe in 2004 in Glia, 46: 195-206 a two channel visual recording of live hippocampus cultures in rats, whereby the two channels are spatially recorded and plotted in 3D for the markers of lectin and sytox over a longer period of time.

N. Yamamoto et al. describe in 2003 in Clin. Exp. Metastasis, 20: 633-638 a two color imaging of human fibrosarcoma cells, whereby green and red fluorescent proteins (GFP and RFP) are simultaneously observed in real time.

S. Bertera et al. describe in 2003 in Biotechniques, 35: 718-722 a multicolor imaging of transgenic mice marked with timer reporter protein, which changes its color from green into red after synthesis. The recording of the image is effected as a rapid series of 3-dimensional images in the tissue of the live animal.

Transmission of Signals Between Cells

The described invention is excellent and very well suited for the analysis of signal transmission processes that are usually extremely rapid. These predominantly neurophysiological processes set the highest demands on temporal resolution since the activities mediated by ions transpire within the range of hundredths to smaller than thousandths of seconds. Exemplary applications of analyses on the muscle and nervous systems are described here, for example:

G. Brum et al. describe in 2000 in J. Physiol. 528: 419-433 the localization of rapid Ca+ activities in muscle cells of the frog after stimulation with caffeine as transmitter. The localization and micrometer-precise resolution succeeded only by virtue of the high speed confocal microscope used.

H. Schmidt et al. describe in 2003 in J Physiol. 551: 13-32 an analysis of Ca+ ions in axons of transgenic mice. The study of rapid Ca+ transients in mice with modified Ca+ binding proteins could only be conducted with a high resolution confocal microscope since both the localization of Ca+ activity within the nerve cell and its exact temporal kinetics play an important role.

The invention claimed is:

1. Process for analyzing developmental processes via the acquisition of images from a sample with a microscope, comprising the steps of:
   (a) detecting image data that correspond to three dimensional sample regions, using the microscope,
   (b) storing the detected image data to memory,
   (c) compressing the detected and stored image data using a CPU or a graphics board, wherein the data of images lying next to one another and over one another on the sample are taken into consideration during compression, and
   (d) using the compressed data to analyze dynamic developmental processes ranging from tenths of seconds to hours at a level of cell groups and entire organisms, using a computer.

2. Process for analyzing intracellular transport processes via the acquisition of images from a sample with a microscope, comprising the steps of:
   (a) detecting image data that correspond to three dimensional sample regions, using the microscope,
   (b) storing the detected image data to memory,
   (c) compressing the detected and stored image data using a CPU or a graphics board, wherein the data of images lying next to one another and over one another on the sample are taken into consideration during compression, and (d) using the compressed data to analyze intracellular transport processes for representing small motile structures with high speeds, using a computer.

3. Process for representing molecular and other subcellular interactions via the acquisition of images from a sample with a microscope, comprising the steps of:
 (a) detecting image data that correspond to three dimensional sample regions, using the microscope,
 (b) storing the detected image data to memory,
 (c) compressing the detected and stored image data using a CPU or a graphics board, wherein the data of images lying next to one another and over one another on the sample are taken into consideration during compression, and
 (d) using the compressed data to represent molecular and other subcellular interactions of very small structures with high speeds, preferably while using indirect techniques for resolving submolecular structures, using a computer.

4. Process for studying rapid signal transmission processes via the acquisition of images from a sample with a microscope, comprising the steps of:
 (a) detecting image data that correspond to three dimensional sample regions, using the microscope,
 (b) storing the detected image data to memory,
 (c) compressing the detected and stored image data using a CPU or a graphics board, wherein the data of images lying next to one another and over one another on the sample are taken into consideration during compression, and
 (d) using the compressed data to study neurophysiological processes with high temporal resolution, using a computer.

* * * * *

UNITED STATES PATENT AND TRADEMARK OFFICE
CERTIFICATE OF CORRECTION

PATENT NO. : 7,593,581 B2  Page 1 of 1
APPLICATION NO. : 10/967332
DATED : September 22, 2009
INVENTOR(S) : Hecht et al.

It is certified that error appears in the above-identified patent and that said Letters Patent is hereby corrected as shown below:

Title page, item [73] assignee, change "Micro Imaging"

to --MicroImaging--

Signed and Sealed this

First Day of December, 2009

David J. Kappos
*Director of the United States Patent and Trademark Office*

UNITED STATES PATENT AND TRADEMARK OFFICE
CERTIFICATE OF CORRECTION

PATENT NO.        : 7,593,581 B2                                           Page 1 of 1
APPLICATION NO.   : 10/967332
DATED             : September 22, 2009
INVENTOR(S)       : Hecht et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1269 days.

Signed and Sealed this

Twenty-first Day of September, 2010

David J. Kappos
*Director of the United States Patent and Trademark Office*